United States Patent [19]

Riano

[11] Patent Number: 5,467,925
[45] Date of Patent: Nov. 21, 1995

[54] SULFUR GUN ASSEMBLY WITH RAPID SERVICE CAPABILITY

[76] Inventor: Marcos D. Riano, Rte. 12, Box 544 (Crow Ct.), Lake City, Fla. 32025

[21] Appl. No.: 301,063

[22] Filed: Sep. 6, 1994

[51] Int. Cl.[6] .................................................. B05B 15/00
[52] U.S. Cl. ...................................... 239/132.3; 239/600
[58] Field of Search .................................. 239/139, 135, 239/132–132.3

[56] References Cited

U.S. PATENT DOCUMENTS

| | | | |
|---|---|---|---|
| 1,192,589 | 7/1916 | Whitney | 239/139 |
| 2,395,483 | 2/1946 | James | 239/139 |
| 3,065,916 | 11/1962 | Kurzinski | 239/132.3 |
| 3,074,648 | 1/1963 | Stone | 239/132.3 |
| 3,387,784 | 6/1968 | Ward, Jr. | 239/132.3 |
| 3,411,716 | 11/1968 | Stephan et al. | 239/132.3 |
| 3,680,785 | 8/1972 | Miller | 239/132.3 |
| 3,876,190 | 4/1975 | Johnston et al. | 239/132.3 |
| 3,972,517 | 8/1976 | Kraizinger et al. | 239/132.3 |
| 4,384,846 | 5/1983 | Waldhofer | 239/132.3 |

Primary Examiner—Andres Kashnikow
Assistant Examiner—Lesley D. Morris
Attorney, Agent, or Firm—Edgar W. Averill, Jr.

[57] ABSTRACT

A sulfur gun assembly which may be easily and rapidly disassembled for service. The sulfur gun assembly has an outer casing supported by a furnace wall and the outer casing has a steam outlet and a steam inlet. An inner casing is coaxially held in the outer casing and sealed to the outer casing to provide a steam type annular space. A sulfur gun slides in and out of the inner casing and may be screwed in place in the inner casing. In the event of the necessity of service the sulfur gun may be unscrewed and pulled out of the inner casing without the necessity of removing either the outer or inner casing. This greatly reduces the time for gun removal and also reduces the weight of the removed parts.

8 Claims, 2 Drawing Sheets

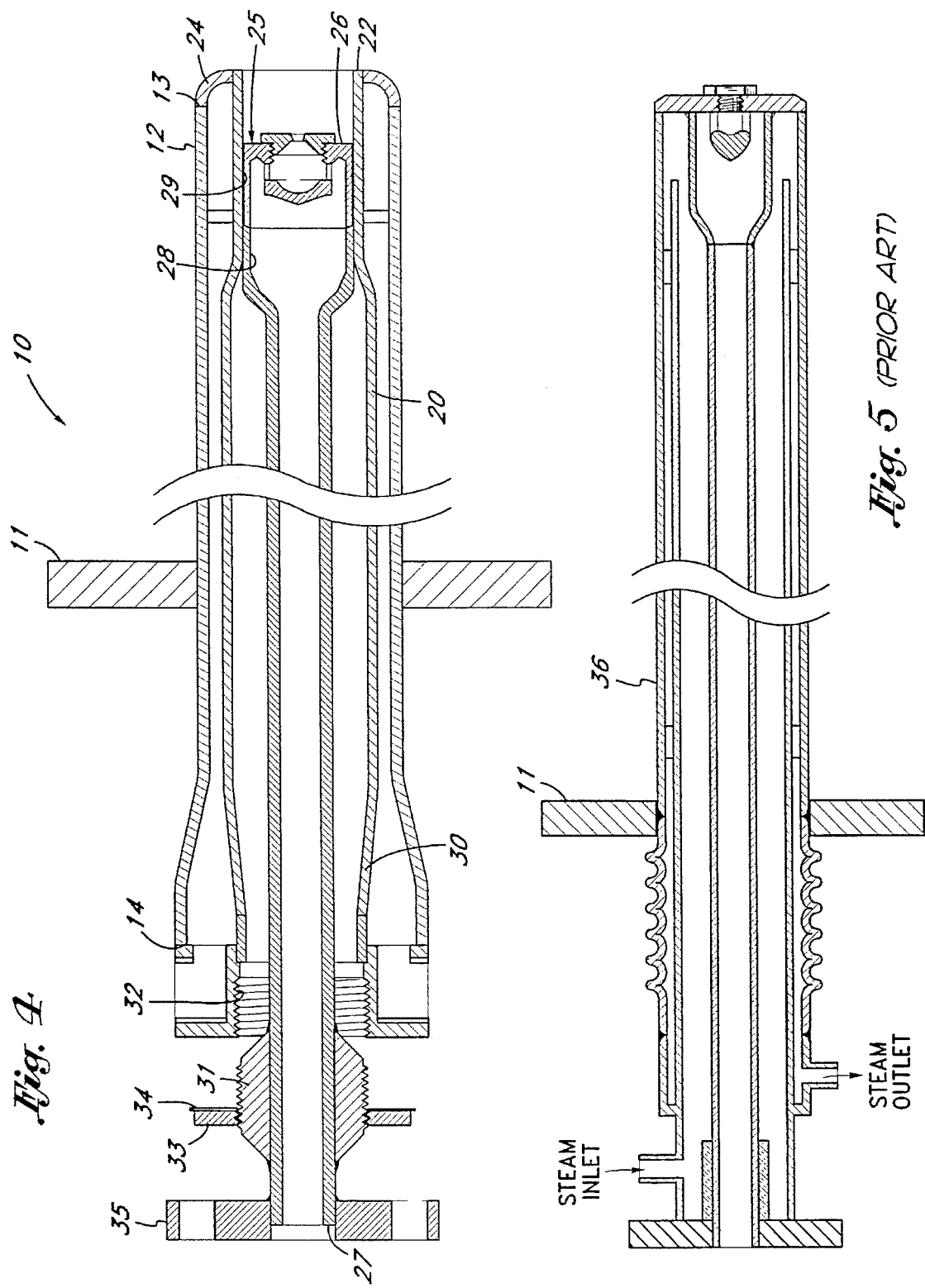

5,467,925

SULFUR GUN ASSEMBLY WITH RAPID SERVICE CAPABILITY

BACKGROUND OF THE INVENTION

The field of the invention is sulfur burning guns and the invention relates more particularly to the service of sulfur burning guns. A nozzle for a sulfur burning gun is shown in applicant's U.S. Pat. No. 4,154,399, the disclosure of which patent is incorporated into the present application by reference. Sulfur guns of the type shown in the present application have been in operation since the 1920s. They atomize molten sulfur in a furnace causing the sulfur to burn and the resulting gas is dissolved in water to make sulfuric acid. The design of the sulfur gun has been improved by the addition of a steam jacket for cooling the gun. The capacity of such guns has also been increased and the net result is that the modern guns can weigh 160 to 170 lbs. per unit. The most common types of sulfur gun problems are due to nozzle or tip failure or simply plugging and in all of these cases the gun must be removed so that the nozzle can be serviced. In the case of the conventional 160 lb. gun which is also very hot, this removal job is difficult and somewhat dangerous. A typical fast replacement of a hot conventional sulfur gun will keep the sulfur plant off line for about 1½ hours, normally using three men for the job. If the sulfur plant is a 2000 ton per day plant, the cost of sulfur gun servicing is about 125 tons of sulfuric acid. Many times the plant is also used to supply steam to a turbo generator which in turn also has to be shut down during service because of the lack of steam production. Thus, the cost of sulfur gun service is substantial.

BRIEF SUMMARY OF THE INVENTION

It is an object of the present invention to provide a sulfur gun assembly which may be easily and safely serviced.

The present invention is for a sulfur gun assembly which may be easily and rapidly disassembled for service. The assembly has an outer casing supported by a furnace wall in a generally horizontal manner. The outer casing has a furnace end and an exterior end and has a steam inlet and a steam outlet for cooling the sulfur gun during use. An inner casing is supported coaxially in the outer casing and provides a steam type annular space between the inner and outer casing for the passage of cooling steam. A sulfur gun is slidably inserted into the inner casing and affixed at the exterior end. When service is necessary, the sulfur gun is merely disconnected at the external end and slid out for service. The gun itself weighs only about 20 lbs. and is easily handled by a single worker. Preferably the inner casing has reduced diameters at both ends so that the gun can more easily be slid in and out. Preferably the sulfur gun is threadably secured at the external end and locked in place by a lock nut.

BRIEF DESCRIPTION OF THE DRAWINGS

FIG. 4 is a cross sectional side view of the gun of FIG. 1 during the sulfur gun removal step.

FIG. 5 is a cross sectional view of a prior art sulfur gun assembly.

DESCRIPTION OF THE PREFERRED EMBODIMENTS

Figure 3:
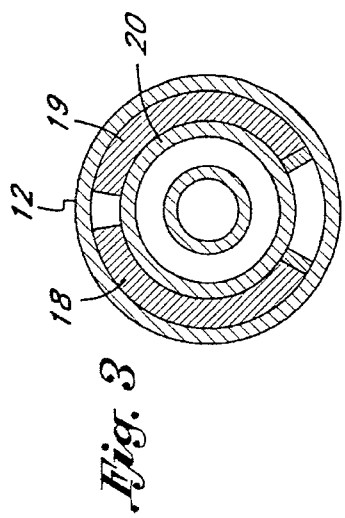
FIG. 3 is a cross sectional view taken along line 3—3 of FIG. 1.
Figure 2:
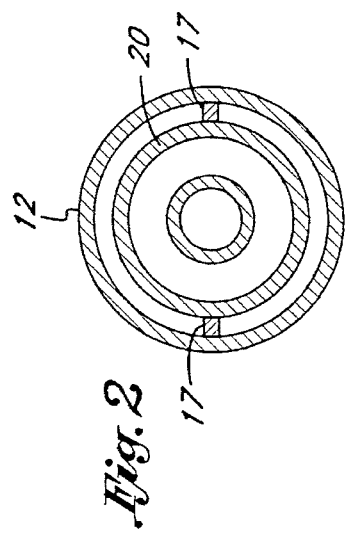
FIG. 2 is a cross sectional view taken along line 2—2 of FIG. 1.
Figure 1:
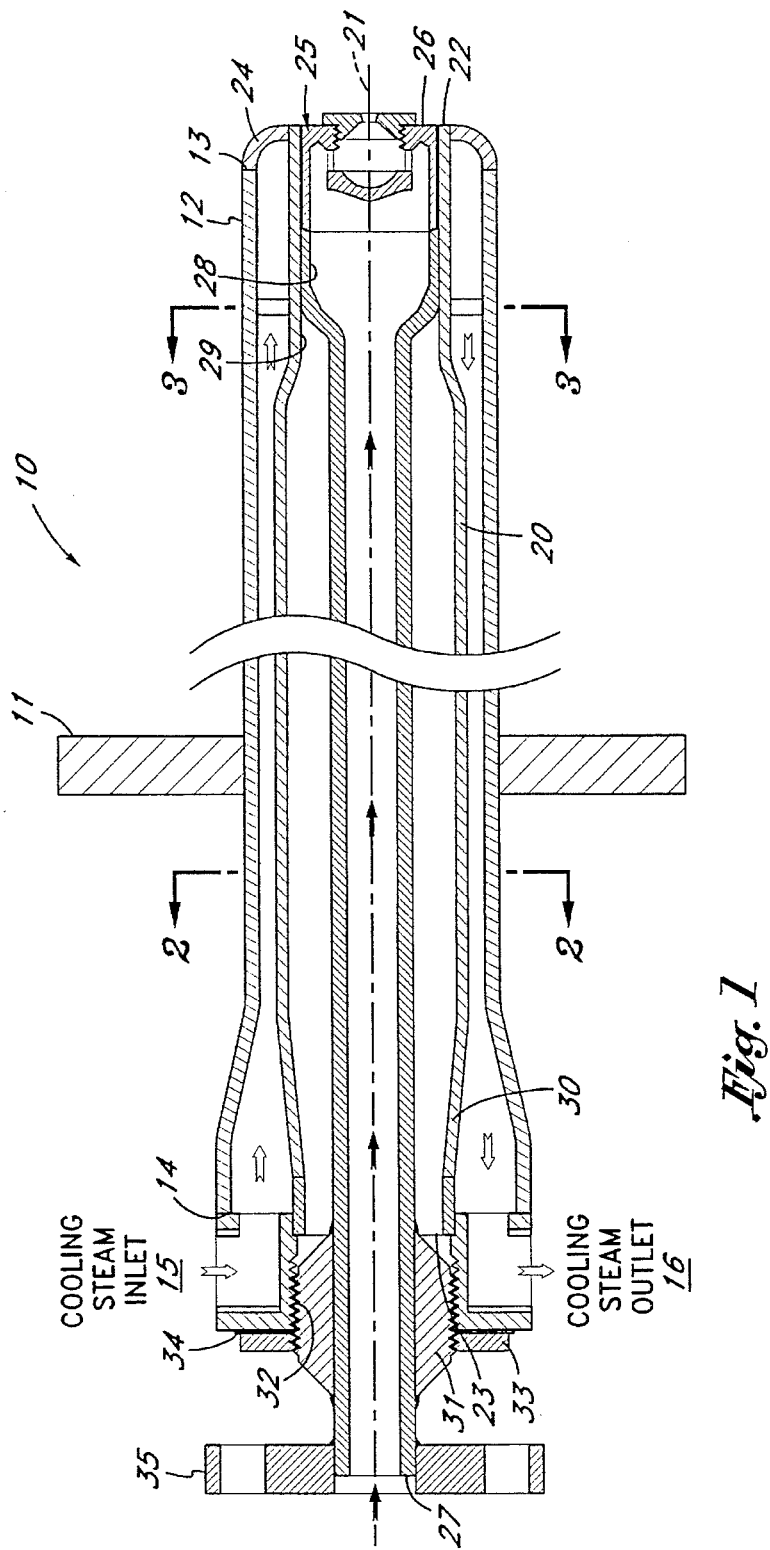
FIG. 1 is a cross sectional side view showing the exterior end and the furnace end of the sulfur gun assembly of the present invention.

The sulfur gun assembly of the present invention is shown in cross sectional view in FIG. 1 and indicated generally by reference character 10. The sulfur gun assembly is supported by a furnace wall 11 and the gun has an outer casing 12, having a furnace end 13 and an exterior end 14, A cooling steam inlet 15 and a cooling steam outlet 16 combine with a longitudinal baffle 17 shown in FIG. 2 and a pair of restrictor plates 18 and 19 shown in FIG. 3 to cause the steam to flow outwardly and back within outer casing 12. More specifically, steam enters inlet 15 and travels outwardly along the gun in the upper half annular space as shown in FIG. 2. It then passes through the upper gap between plates 18 and 19. The longitudinal baffles do not extend past plates 18 and 19 so the steam reverses direction and begins its return by passing through the lower gap between plates 18 and 19 and exits cooling steam outlet 16. Thus, the outgoing steam does not mix with the incoming steam.

An inner casing 20 is supported coaxially with reference to the sulfur gun longitudinal axis 21 as is outer casing 12. Inner casing 20 has a furnace end 22 and an exterior end 23. The inner casing is sealed to the outer casing at the outer end by a portion of pipe cap 24. A sulfur gun 25 has nozzle end 26 and an exterior end 27. The nozzle end has an expanded portion 28 which slides within a reduced portion 29 of inner casing 20. The difference between the outside diameter of the expanded portion 28 and the inside diameter of reduced portion 29 is about 1/16". This provides a sufficiently tight fit and yet permits the sulfur gun 25 to be easily slid in and out of the inner casing 20. Inner casing 20 also has a reduced portion 30 near its exterior end which facilitates the entrance and exit of steam.

Sulfur gun 25 is secured within the gun assembly by a threaded spacer 31 having a tapered inner end screwed into threads 32 near the exterior end 23 of inner casing 20. A lock nut 33 and a gasket 34 help to secure the gun in place. A flange 35 is secured to the exterior end 27 of the sulfur gun which is used to affix the source of molten sulfur to the sulfur gun in a conventional manner.

The prior art sulfur gun is shown in FIG. 5. In order to be serviced the entire assembly 36 must be removed from the furnace. Next the nozzle must be cut away from the base of the assembly and the gun flange bored to pull the nozzle out. This also involves breaking two ½" to ¾" steam pipe unions; eight ⅞" bolts; four ⅝" bolts and then removal of the sulfur gun from the furnace This job requires about 1½ hrs using three men. The removed assembly weighs about 170 lbs. In contrast the removal of the sulfur gun for service of the gun of the present invention is shown in FIG. 4 where all that is required is the removal of the bolts (not shown) from flange 35 and the unscrewing of threaded spacer 31 from threads 32. The gun portion then can simply be pulled out and serviced or replaced. The removed gun portion weighs only about 20 lbs. This simplified job takes only about ½ hr. and requires only one man although a second man is always appropriate for safety purposes.

The result is a sulfur gun of high capacity which nonetheless may be easily serviced. It is believed that this new design will greatly improve the efficiency of a plant which requires sulfur gun service.

Typical sizes of the elements of the assembly include a 4" outer casing, a 2½" inner casing at the reduced ends with a 3" inner casing through most of the length of the gun. The gun itself has a 1" sulfur line and the sulfur nozzle is enlarged to provide a 1/16" clearance between the reduced end of the inner casing and the outside diameter of the nozzle portion of the gun. The openings in the restrictor plate between plates 18 and 19 are preferably about a 20° inlet at the top and a 55° outlet at the bottom. The assembly typically extends 6 feet inside furnace wall 11 and about 1 foot external furnace wall 11.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

I claim:

1. A sulfur gun assembly which may be easily and rapidly disassembled for service comprising:

an outer casing supported by a furnace wall in a generally horizontal manner, said outer casing having a furnace end and an exterior end, said outer casing having a steam inlet and a steam outlet for cooling a sulfur gun during use, said outer casing mounted coaxially with a sulfur gun longitudinal axis;

an inner casing passing from the furnace end to the exterior end of said outer casing, said inner casing also being mounted coaxially with said sulfur gun longitudinal axis and also having a furnace end and an exterior end, and said inner casing being sealed to said outer casing at the furnace end and the exterior end to provide a steam tight chamber between the inner and outer casing;

a sulfur gun having a longitudinal barrel and a nozzle, an exterior end, a nozzle end and a nozzle outside diameter, said gun held coaxially within said inner casing, said sulfur gun being free of any attachment at the nozzle end to said inner casing, said sulfur gun being slidable in and out of said inner casing whereby the sulfur gun may be readily removed from the inner casing for service without having to remove the outer or inner casing from the furnace wall.

2. The sulfur gun assembly of claim 1 wherein said inner casing has a reduced diameter at the furnace end and an enlarged diameter along a length so that the sulfur gun may be more easily pulled out of the inner casing during service.

3. The sulfur gun assembly of claim 2 wherein the inner casing has a reduced diameter at the exterior end.

4. The sulfur gun assembly of claim 3 wherein a difference in the reduced diameter of the inner casing at the furnace end and the exterior end as compared to the enlarged diameter along the length of the inner casing is about ½".

5. The sulfur gun assembly of claim 1 wherein the sulfur gun is held in the inner casing by an externally threaded spacer affixed near the exterior end of the sulfur gun, said externally threaded spacer having an inner end and an exterior end.

6. The sulfur gun assembly of claim 5 wherein said externally threaded spacer is tapered at its inner end.

7. The sulfur gun assembly of claim 2 wherein the nozzle outside diameter of the inner casing and the reduced diameter differ by about 1/16".

8. The sulfur gun assembly of claim 2 wherein the outer casing has an enlarged diameter at the exterior end of the outer casing.

* * * * *